United States Patent
Pramod et al.

(10) Patent No.: US 10,960,922 B2
(45) Date of Patent: Mar. 30, 2021

(54) FAULT TOLERANT FIELD ORIENTED CONTROL FOR ELECTRIC POWER STEERING

(71) Applicant: STEERING SOLUTIONS IP HOLDING CORPORATION, Saginaw, MI (US)

(72) Inventors: Prerit Pramod, Saginaw, MI (US); Rakesh Mitra, Saginaw, MI (US); Jeffery A. Zuraski, Saginaw, MI (US); Ashok Chandy, Palo Alto, CA (US); Julie A. Kleinau, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 333 days.

(21) Appl. No.: 15/420,260

(22) Filed: Jan. 31, 2017

(65) Prior Publication Data
US 2018/0215409 A1 Aug. 2, 2018

(51) Int. Cl.
| | |
|---|---|
| *B62D 5/04* | (2006.01) |
| *H02P 21/18* | (2016.01) |
| *H02P 21/13* | (2006.01) |
| *H02P 6/18* | (2016.01) |
| *H02P 29/032* | (2016.01) |
| *B62D 15/02* | (2006.01) |
| *H02P 6/16* | (2016.01) |

(52) U.S. Cl.
CPC ......... *B62D 5/049* (2013.01); *B62D 15/0235* (2013.01); *H02P 6/16* (2013.01); *H02P 6/181* (2013.01); *H02P 21/13* (2013.01); *H02P 21/18* (2016.02); *H02P 29/032* (2016.02)

(58) Field of Classification Search
CPC ..... B62D 15/0235; B62D 5/049; H02P 21/13; H02P 21/18; H02P 29/028; H02P 6/16; H02P 6/181
See application file for complete search history.

(56) References Cited

U.S. PATENT DOCUMENTS

| | | | |
|---|---|---|---|
| 8,185,342 B2 | 5/2012 | Yeh | |
| 9,966,885 B1 * | 5/2018 | Strong | ................... G01R 33/07 |
| (Continued) | | | |

OTHER PUBLICATIONS

Chinese Office Action dated Dec. 4, 2019 in Chinese Application No. 2018 00789203.

*Primary Examiner* — Manuel A Rivera Vargas
*Assistant Examiner* — Yaritza H Perez Bermudez
(74) *Attorney, Agent, or Firm* — Dickinson Wright PLLC

(57) ABSTRACT

A control system for monitoring operation of an electric motor includes a plurality of position sensors configured to measure a position of the electric motor, an indirect position estimation module configured to indirectly estimate the position of the motor, and an error monitoring module. The error monitoring module is configured to perform at least one of: comparing a measured position from the plurality of position sensors to an estimated position from the sensor position estimation module, and detecting a failure of at least one of the one or more position sensors based on the comparison; and calculating a difference between the measured position from one of the plurality of position sensors and the measured position from another of the plurality of position sensors, and causing the indirect position estimation module to initiate estimation of the position of the motor based on the difference.

14 Claims, 5 Drawing Sheets

(56) References Cited

U.S. PATENT DOCUMENTS

| | | | |
|---|---|---|---|
| 2005/0007044 A1* | 1/2005 | Qiu | G05B 13/048 318/400.02 |
| 2005/0031322 A1* | 2/2005 | Boyle | A61M 16/0057 388/800 |
| 2010/0045219 A1* | 2/2010 | Ajima | H02P 6/10 318/400.04 |
| 2011/0074320 A1* | 3/2011 | Nakamura | H02P 5/74 318/400.02 |
| 2013/0141024 A1* | 6/2013 | Wu | H02P 6/18 318/400.14 |
| 2014/0204358 A1* | 7/2014 | Yang | H02K 41/031 355/72 |
| 2014/0244113 A1* | 8/2014 | Collier-Hallman | B62D 5/046 701/41 |
| 2017/0237375 A1* | 8/2017 | Pramod | H02P 6/28 318/400.02 |
| 2018/0131305 A1* | 5/2018 | Wang | H02P 21/18 |

* cited by examiner

FAULT TOLERANT FIELD ORIENTED CONTROL FOR ELECTRIC POWER STEERING

BACKGROUND OF THE INVENTION

Electric Power Steering (EPS) systems utilize an electric motor, such as a Permanent Magnet Synchronous Machine (PMSM), to provide steering assist to a driver. One control technique is called Field Oriented Control (FOC), which allows the sinusoidal three-phase motor voltage and current signals to be transformed into signal based on a synchronously rotating reference frame, commonly referred to as the direct-quadrature (DQ) reference frame, where the motor voltages and currents become direct current (DC) quantities. The DQ reference frame transformation requires positional information of the machine, which is usually obtained by using a physical position sensor. As an alternative, sensorless control (SC) refers to the class of control schemes in which the motor is controlled without a physical position sensor. In contrast with its sensor-based counterpart, SC-FOC schemes employ observers or estimators to obtain the position of the machine, however, the overall control architecture is similar to a sensor-based FOC scheme.

SUMMARY OF THE INVENTION

In one embodiment of the invention, a control system for monitoring operation of an electric motor includes a plurality of position sensors configured to measure a position of the electric motor, an indirect position estimation module configured to indirectly estimate the position of the motor, and an error monitoring module. The error monitoring module is configured to perform at least one of: comparing a measured position from the plurality of position sensors to an estimated position from the sensor position estimation module, and detecting a failure of at least one of the one or more position sensors based on the comparison; and calculating a difference between the measured position from one of the plurality of position sensors and the measured position from another of the plurality of position sensors, and causing the indirect position estimation module to initiate estimation of the position of the motor based on the difference.

In another embodiment of the invention, a method of monitoring operation of an electric motor includes measuring a position of the electric motor by a plurality of position sensors during a field oriented control (FOC) operation mode. The method also includes calculating, by an error monitoring module, a difference between the measured position from one of the plurality of position sensors and the measured position from another of the plurality of position sensors, and based on the difference exceeding a selected threshold, causing an indirect position estimation module to initiate an indirect estimation of the position of the motor.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
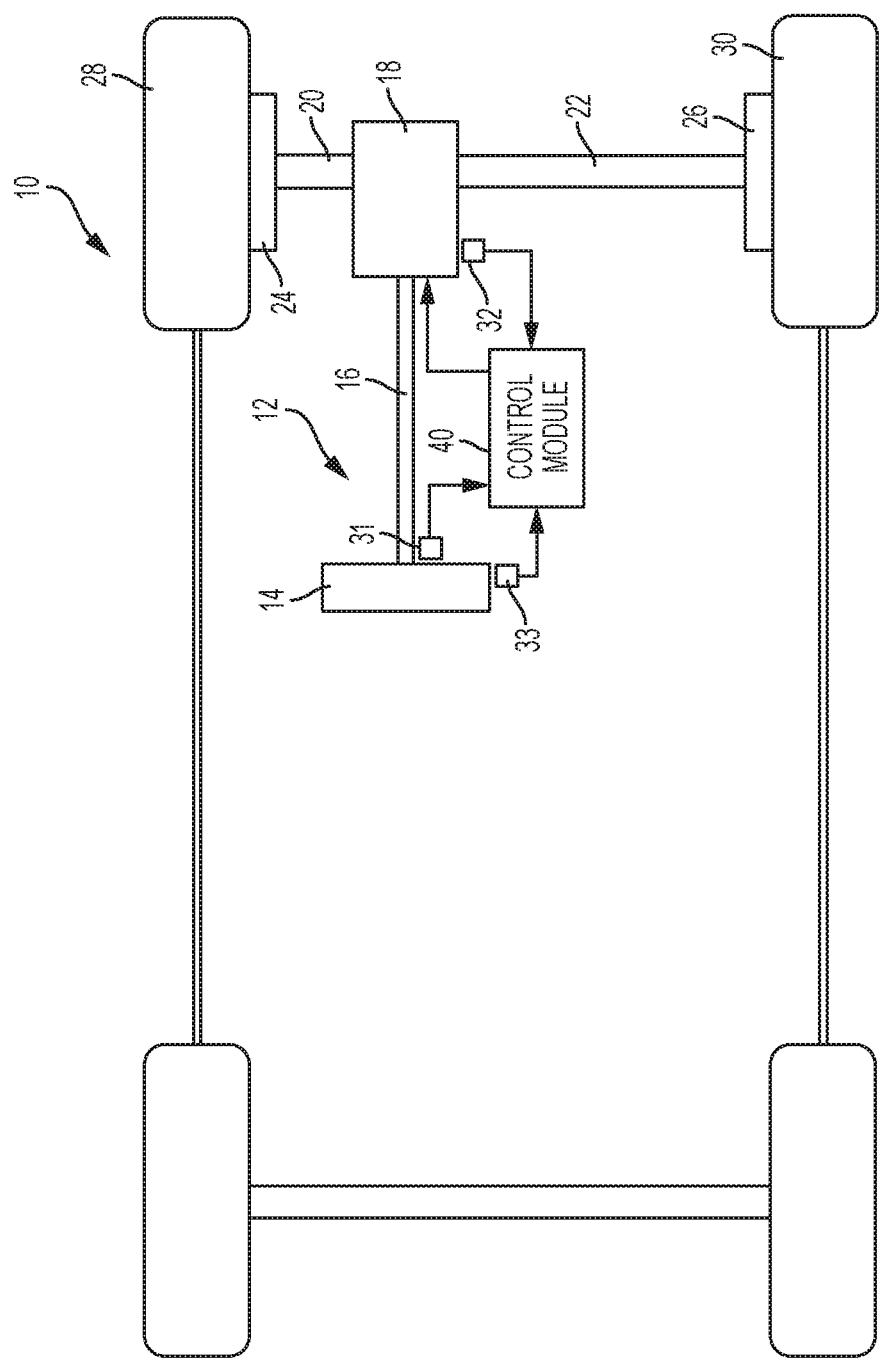
FIG. 1 is a functional block diagram of a steering system that includes a fault tolerant field oriented control system in accordance with one embodiment of the disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, where the invention will be described with reference to specific embodiments without limiting same, an exemplary embodiment of a vehicle 10 including a steering system 12 is illustrated. In various embodiments, the steering system 12 includes a hand wheel 14 coupled to a steering shaft 16. In one exemplary embodiment, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a rack and pinion steering mechanism (not shown) that may be coupled through the steering shaft 16 to a steering actuator motor and gearing (hereinafter referred to as the steering actuator). During operation, as the hand wheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10. Although an EPS system is illustrated in FIG. 1 and described herein, it is appreciated that the steering system 12 of the present disclosure can include various controlled steering systems including, but not limited to, steering systems with hydraulic configurations, and steer by wire configurations.

As shown in FIG. 1, the vehicle 10 further includes various sensors 31-33 that detect and measure observable conditions of the steering system 12 and/or of the vehicle 10. The sensors 31-33 generate sensor signals based on the observable conditions. In various embodiments, the sensors 31-33 include, for example, a motor position sensor. In one embodiment, the motor position sensor is an analog position sensor that generates signals representing the sine and cosine of the motor shaft angle. The motor position sensor sends the signals to the control module 40.

In various embodiments, a control module 40 controls the operation of the steering system 12 and/or the vehicle 10 based on one or more of the sensor signals and further based on error detection system and method of the present disclosure.

Embodiments described herein can be part of a steering system such as an electrical power steering (EPS), driver assistance system and/or vehicle control system (e.g., autonomous or semi-autonomous steering system). It is noted that the embodiments described herein may be employed in conjunction with any device or system that utilizes an electric motor or motors.

Figure 2:
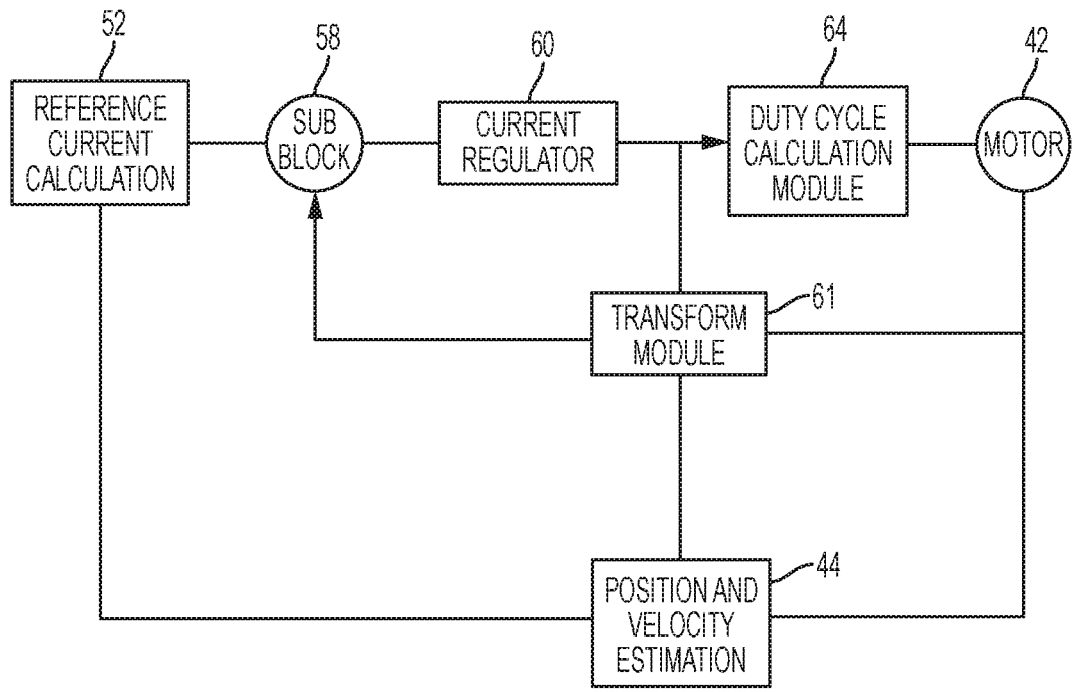
FIG. 2 is a functional block diagram of a field oriented control (FOC) system for an electrical motor.

Referring to FIG. 2 with continuing reference to FIG. 1, a general field oriented control architecture of a permanent magnet synchronous machine is shown. Specifically, a motor 42 of the steering assist unit 18 generates a steering assist torque that is applied to the steering system. A position and velocity estimation module 44 monitors an actual current produced by the motor 42. The actual current is related to the assist torque provided by the motor 42. The position and velocity estimation module 44 generates a motor position and a motor velocity.

A reference current calculation module 52 receives the motor velocity from the position and velocity estimation module 44. In addition, the reference current calculation module 52 receives a desired torque from the steering assist unit 18. Based on the desired torque and the motor velocity, the reference current calculation module 52 calculates a current command that is output to subtraction block 58. Subtraction block 58 subtracts a DQ reference frame current from the current command to generate a difference, which is provided to the current regulator module 60. The DQ reference frame current may be generated by a transform module 61, which is in communication with the motor 42, the position and velocity estimation module 44, the motor 42, and the reference current calculation module 52. Based on the difference, the current regulator 60 generates a motor voltage command. The motor voltage command is sent to a duty cycle calculation module 64, which analyzes the motor voltage command and generates a duty cycle signal. The duty cycle signal is used by an inverter to apply a motor voltage representative of the motor voltage command to the motor 42. In one embodiment, an inverter applies the motor voltage. The position and velocity estimation module 44, reference current calculation module 52, current regulator module 60, and the duty cycle calculation module 64 may be a part of the control module 40, but are not so limited.

A control system, such as the control module 44 and/or aspects of the control architecture, is configured to operate under multiple control modes. A first control mode is utilized in situations where position sensors are working properly and no sensor errors are detected. The first control mode utilizes Field Oriented Control (FOC), which uses information from physical position sensors (direct measurements) for the DQ reference frame transformation. A second control mode may be utilized when one or more of the position sensors have failed. An example of the second control mode is referred to as Fault Tolerant Control (FTC), which is a mode of operation of the FOC system where normal operation of the physical position sensor has failed and positional information is obtained indirectly (without a physical position sensor) from an observer or estimator. The FTC mode may use sensorless control (SC), which involves controlling the motor without the use of one or more of the position sensors. In this mode, an observer-based position measurement is used.

In a position sensor-based FOC system, there is always a possibility of failure of position sensors. The FTC mode can be triggered or used in situations where one or more of the position sensors have failed. For example, the FTC control mode is provided as a backup so that the motor can be controlled without significant interruption when operation of some or all of the physical position sensors have failed. Accordingly, in one embodiment, embodiments described herein allow for transition from a FOC mode to a FTC mode.

Figure 3:
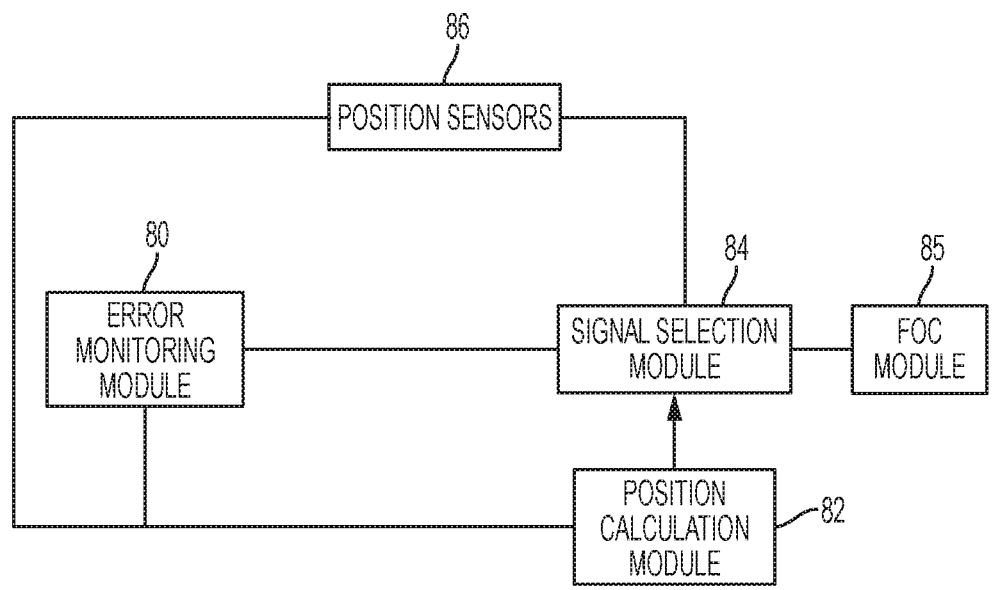
FIG. 3 is a position error monitoring and triggering system in accordance with one embodiment of the disclosure.

Detection of sensor failure is discussed with reference to FIG. 3, which shows an embodiment of the position and velocity estimation module 44. In various embodiments, the control module 40 and the position and velocity estimation module 44 can include one or more sub-modules and data stores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from the sensors of the vehicle 10 (FIG. 1), can be modeled within the control module 40 (e.g., by other sub-modules (not shown)), can be received from other control modules (not shown), and/or can be predefined. Each of the various modules and sub-modules described herein can be implemented as individual modules, can be combined and/or can be partitioned. For example, the modules shown in FIGS. 2 and 3 can be implemented as a single control module or multiple control modules.

In this embodiment, the position and velocity estimation module 44 includes an error monitoring module 80, a position calculation module 82, and a signal selection module 84. The selection module 84 may generate a flag or diagnostic signal to trigger the FTC mode, e.g., by transmitting the diagnostic signal to a FOC module 85.

The position and velocity estimation module 44 (or other suitable processor, processing unit or module) is configured to receive position signals from position sensors 86, and also to indirectly estimate a motor position without using a position sensor, such as by using an observer-based technique. The module 44 may detect a sensor error based on a comparison between the indirectly estimated position and one or more position signals from one or more position sensors. The module 44 may also be configured to initialize a sensorless control algorithm in response to detecting an error, and/or prompt a fault tolerant control mode if all physical sensors have failed or otherwise presented an error.

Figure 4:
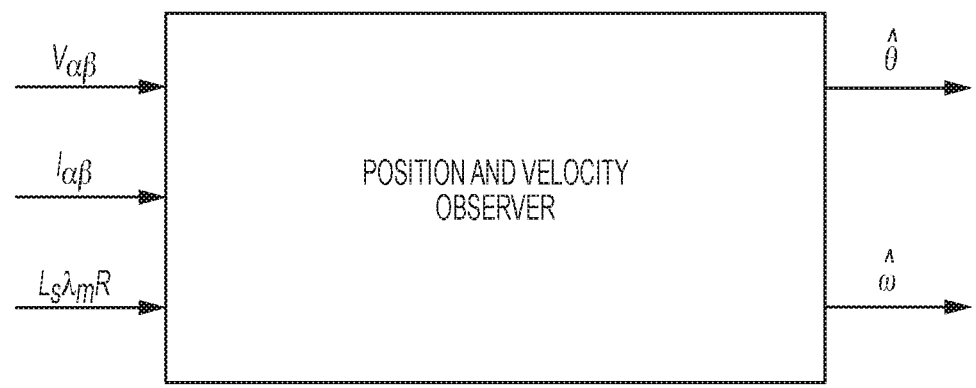
FIG. 4 depicts an example of an observer for indirectly estimating motor position.

The motor position may be indirectly estimated using any suitable method or technique. In one embodiment, an estimate of the position is calculated using an observer based on various input parameters, such as the actual phase currents, applied voltages and machine parameters as inputs used to produce position and velocity estimates. FIG. 4 shows an example of a general observer interface. As shown, a position and velocity observer uses a stationary frame or $\alpha\beta$ model of the electric motor to estimate position and motor velocity. The observer receives as inputs a stationary frame voltage signal ($V_{\alpha\beta}$) and current signal ($I_{\alpha\beta}$), and motor parameters such as inductance ($L_s$), magnet flux ($\lambda_m$) and resistance (R). The observer then outputs an estimated motor position $\hat{\theta}$ and an estimated motor angular velocity $\hat{\omega}$.

There are numerous algorithms for estimating position of a PMSM machine, and these vary specifically for different operating speed regions. In general, robust techniques such as those based on Sliding Mode Control (SMC), can be used for estimating position of all kinds of PMSM machines (salient or non-salient pole) in the high speed region. For such observers, the diagnostic may be implemented as a conditional diagnostic, i.e., which is disabled when the speed is below a calibratable threshold. The speed signal may be an estimated quantity or may be obtained by differentiating the position signal from one of the physical sensors.

One of the methods for estimation involves estimation of position and velocity of PMSM from the stator flux linkage which is obtained using the voltage and current signals of the motor.

In one embodiment, the estimated position is generated by a position observer that estimates position based on a plant model of the motor in the synchronous or DQ reference frame. Stator flux linkages are calculated from the voltage and currents using discrete integration, initial values of the flux linkages are calculated from an initial position ($\theta_0$), and an initial current magnitude and motor position angle are calculated therefrom.

The control system (e.g., the position and velocity estimation module 44 and/or the error monitoring module 80) detects an error condition due to the failure of one or more position sensors by comparing the estimated position (e.g., based on an observer) to measured positions from the position sensors. In one embodiment, the system includes two or more position sensors. An "error condition" refers to a condition in which a physical position sensor has failed or in which there is a significant potential for failure.

Error conditions can be detected using the plant model. In one example, current estimates using the plant model are generated in the stationary reference frame as $I_{\alpha 1}$ and $I_{\beta 1}$. Current errors $\Delta I_{\alpha e1}$ and $\Delta I_{\beta e1}$ are calculated as the difference between the estimated and measured currents. Position errors $\Delta\theta\alpha[n]$ and $\Delta\theta\beta[n]$ for a position sensor n are then calculated based on the current errors.

In one step of calculating the position errors, there is a calculation term which contains terms $\sin\theta_\alpha$ and $\cos\theta_\beta$ in the denominator of estimated position error equations as shown below:

$$\Delta\theta_\alpha[n] = \frac{-L_\alpha \Delta I_{\alpha e1}[n]}{\lambda_m \sin(\theta[n-1])}$$

$$\Delta\theta_\beta[n] = \frac{L_\beta \Delta I_{\beta e1}[n]}{\lambda_m \cos(\theta[n-1])}$$

Since the sine and cosine terms may become zero, a selection window based conditional checks can be generated to use the average of the two position errors or either of the two, based on which term becomes zero. A position-window based selection scheme may be utilized to compute the position error $\Delta\theta[n]$. This scheme may be mathematically expressed as follows.

$$\Delta\theta[n] = \begin{cases} \Delta\theta_\alpha, & \theta[n-1] \in \left[0, \frac{\pi}{2} - \theta_W\right] \cup \left[\frac{\pi}{2} + \theta_W, \frac{3\pi}{2} - \theta_W\right] \cup \left[\frac{3\pi}{2} + \theta_W, 2\pi\right] \\ \Delta\theta_\beta, & \text{else} \end{cases}$$

For example, if a position window ($\theta_W$) is chosen to be $$\frac{\pi}{4},$$

the position error is calculated exactly half the time using $\Delta\theta_\alpha$ and $\Delta\theta_\beta$ each. Note that the quality of the position signal varies with the choice of the window $\theta_W$.

Detection of a sensor failure may be realized through a truth table or other comparison scheme that allow for comparison between position measurements from physical sensors and comparison between position measurements and indirect position estimates.

An example of a comparison scheme for detecting a sensor failure is shown below. In this example, there are two physical position sensors that output position measurements $\theta_1$ and $\theta_2$. An estimated position from an observer is denoted as $\theta_{est}$. The following truth table illustrates how a comparison scheme may be implemented for a three sensors system where one of the sensor signals is estimated.

| $\theta_1$ vs $\theta_2$ | $\theta_2$ vs $\theta_{est}$ | $\theta_1$ vs $\theta_{est}$ | $F_{c1}$ | $F_{c2}$ | $F_s$ |
|---|---|---|---|---|---|
| Pass | Pass | Pass | No fault | No fault | No fault |
| Pass | Pass | Fail | | Not possible | |
| Pass | Fail | Pass | | Not possible | |
| Pass | Fail | Fail | No fault | No fault | Fault |
| Fail | Pass | Pass | | Not possible | |
| Fail | Pass | Fail | Fault | No fault | No fault |
| Fail | Fail | Pass | No fault | Fault | No fault |
| Fail | Fail | Fail | Fault | Fault | Fault |

In the above scheme, a difference between the position measurements $\theta_1$ and $\theta_2$ is calculated, and a difference between the estimated position and each position measurement is calculated. If the result of any comparison exceeds a selected threshold (which may be the same or different for the various comparisons), the comparison results in a "Fail". Whether a fault is determined for a given position sensor is dictated by the truth table.

Outputs from the comparisons may include a flag or other indicator of whether a sensor has failed or could fail. For example, the output of the above scheme is a comparison health status flag $F_{ck}$ (where k is the number of the sensor) indicating the health status of each individual sensor k. Further, if each sensor has self-diagnostics as indicated by a self-diagnostic health status flag $F_{sk}$, those may be used in addition to the above comparison scheme to detect failures. For instance, an AND operation may be performed between $F_{ck}$ and $F_{sk}$. The comparison health status flag is provided for each sensor to indicate if there is a failure or a potential failure.

As described in more detail below, position information may be obtained by the position and velocity estimation module 44 during a failure, and transmitted to an FOC module 85, for example, for processing by an estimation algorithm.

In one embodiment, the error monitoring module 80 or other suitable control system is configured to determine whether an error condition exists (e.g., that one or more sensors have failed or could potentially fail), and may also be configured to identify a specific sensor or sensors that have failed or otherwise presented an error. The error condition determination and/or sensor identification method is discussed in conjunction with an example of the position and velocity estimation module 44 shown in FIG. 5.

Figure 5:
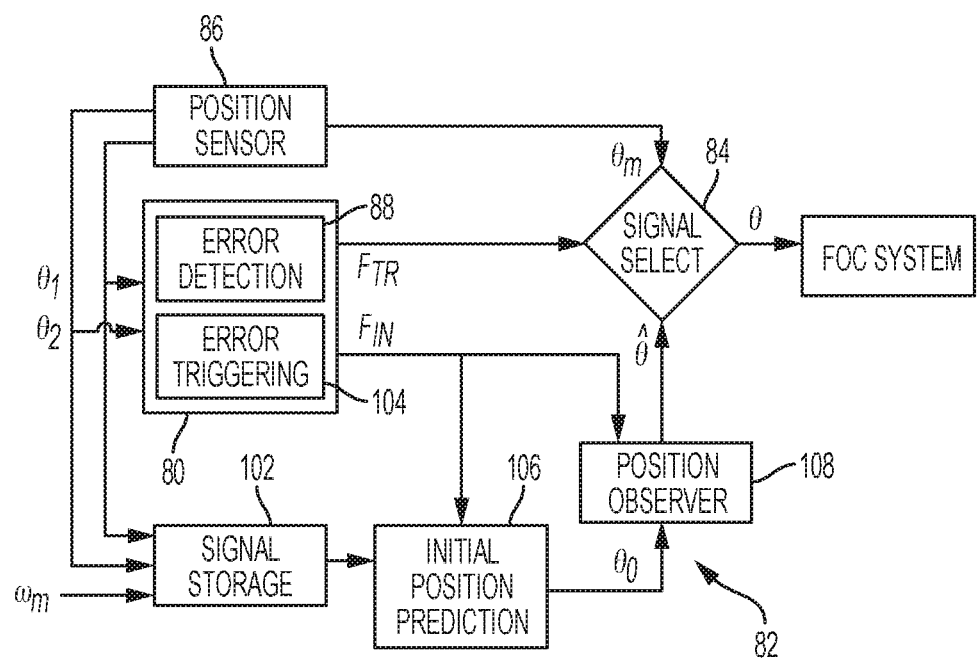
FIG. 5 depicts an example of a position error monitoring and triggering system.

Referring to FIG. 5, the signal selection module 84 receives as input a set of motor position signals from a set of position sensors 86. The set of position sensors 86 may include a primary motor position sensor and a secondary position sensor, for example. The set of position sensors 86 may be from the group of sensors 31-33 (FIG. 1). Based on the motor position signals, the error monitoring module 80 performs a correlation check to compare the motor position signals and determine an error signal ($\theta_{err}$). Determination of the error signal may be performed by an error-detection sub-module 88.

In one embodiment, the error signal $\theta_{err}$ is an angular difference between the respective motor position signals of the set of motor position signals. Specifically, the error signal may be calculated by the following equation:

$$\theta_{err} = |\theta_1 - \theta_2|$$

where $\theta_1$ and $\theta_2$ are the motor position signals from the primary physical position sensor and the secondary physical position sensor, respectively.

In one embodiment, the error monitoring module 80 evaluates the error signal to determine whether the error signal is greater than a preset threshold for a specified period of time. One or more flags (F) may be output to indicate that there is an error condition. A triggering flag ($F_{IN}$), also referred to as an initiation flag, may be output to the position calculation module 82 in response to detecting an error signal. In addition, a transition flag $F_{TR}$ may be output to the signal selection module 84 to initiate transition from a FOC mode to a FTC mode as discussed further below.

For example, the error monitoring, triggering and/or detection schemes presented herein generate a triggering flag $F_{IN}$ which indicates a potential failure or "proximity to failure" condition and triggers an initial position prediction system and an SC algorithm. In addition, a transition flag $F_{TR}$ can be generated that indicates a "sensor failed" or actual failure condition and disables the position based FOC algorithm (normal operation) and triggers the FTC mode in which the FOC system is operated with the estimated position.

In one embodiment, a time invariant error detection scheme is used by the error monitoring module 80 to generate trigger flags. In another embodiment, a time-varying detection scheme is used by the error monitoring module 80 to generate trigger flags. However, other error detection schemes, including but not limited to those described below, are contemplated by this disclosure.

Figure 6:
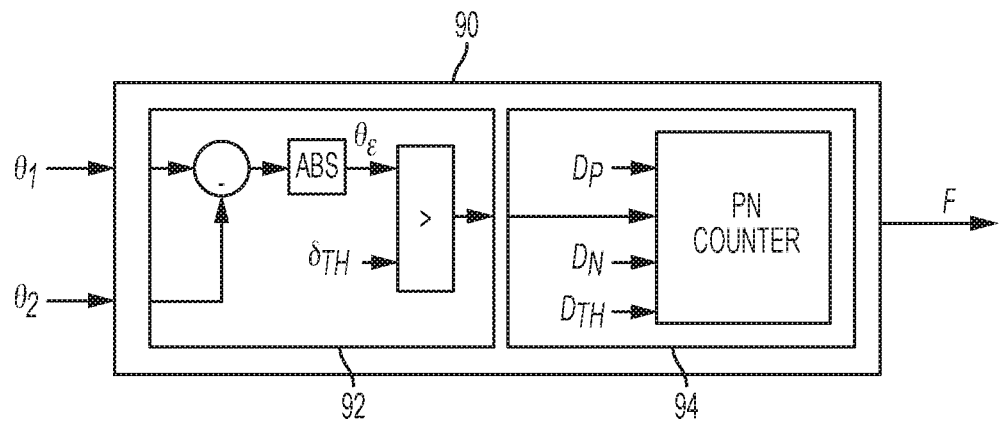
FIG. 6 depicts a time invariant detector in accordance with one embodiment of the disclosure.

An embodiment of a time invariant error detection scheme is discussed in conjunction with FIG. 6, which shows an example of a time invariant error detector 90. The time invariant error detector 90 may implement a time invariant error detection scheme. In a time invariant error detection scheme, a threshold detector 92 detects when an error signal becomes greater than an error threshold. A counter 94 increases a value in discrete steps. When the counter value becomes greater than a detector threshold, the triggering flag and initiation flag are enabled. If, however, the error signal transitions to becoming less than the error threshold before a detector threshold is reached and the flags are enabled, the counter value is decreased in discrete steps representative of a predetermined value. The total time required for the triggering flag to be enabled is independent of the magnitude that the error signal exceeds an error threshold. In the example of FIG. 6, the threshold detector 92 receives position signals $\theta_1$ and $\theta_2$, calculates a difference $\theta_e$ between the signals, and compares the difference to a threshold $\delta_{TH}$. The counter 94 is a PN counter in this example, which counts up by increments $D_P$ if the difference $\theta_e$ exceeds the threshold $\delta_{TH}$. If the difference returns to less than or equal to the threshold, the PN counter counts down by increments $D_N$. When the count reaches or exceeds a count threshold $D_{TH}$, the PN counter enables a triggering flag F.

Figure 7:
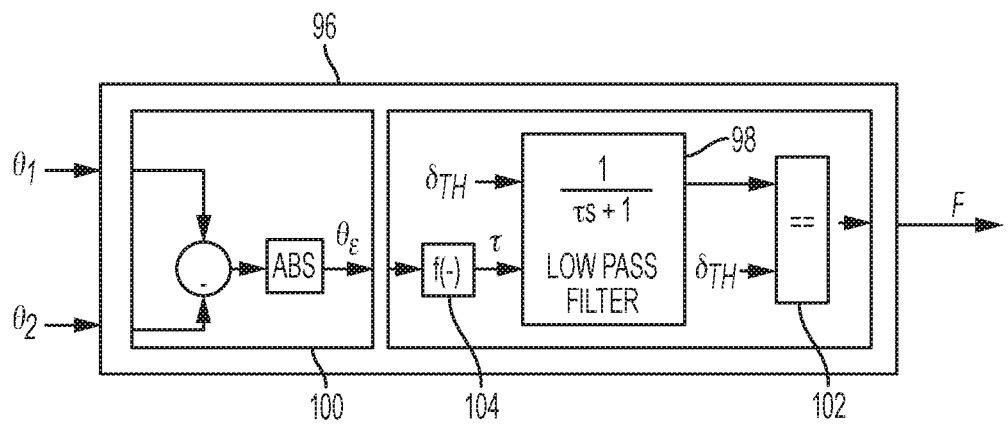
FIG. 7 depicts a time varying detector in accordance with one embodiment of the disclosure.

A time-varying error detection scheme can be used by the error monitoring module 80. FIG. 7 shows an example of a time-varying error detector 96 that can implement a time varying error detection scheme. In a time varying error detector, different error amounts are detected in variable time durations. Consequently, larger faults (i.e. greater magnitudes of error signals) may be detected, causing the triggering flag to be enabled within a shorter period of time. In this example, the time-varying error detector 96 includes a low-pass filter 98, an error or difference calculator 100 and a modified counter 102. The detector 96 also includes a variable cutoff frequency filter 104 that outputs a time-constant $\tau$, where the frequency and consequently the time-constant being a function $f(.)$ of the error input (the difference $\theta_e$). An output of the low-pass filter 98 is compared with a fixed threshold $\delta_{TH}$, causing the triggering flag F to be set if the output of the low pass filter 98 exceeds the fixed threshold. An output signal may be produced with exponential characteristics which are indicative of a magnitude of the error signal.

In one embodiment, the control system is configured to perform a monitoring, triggering and/or transition control method that includes detecting an error condition as described above. The control method in this embodiment includes monitoring physical position sensors via a correlation check to compare the motor position signals and determine an error signal $\theta_{err}$. If the error signal exceeds a first threshold (referred to herein as an initialization threshold), a potential failure condition or "proximity to failure" condition is detected and sensorless position estimation is prompted. If the error signal exceeds a second threshold (referred to herein as a transition threshold) that is higher than the first threshold, an actual failure condition is detected in which at least one sensor has failed, and the control system is prompted to transition from normal control to FTC mode. The method may also include detecting which position sensor has failed or represents a potential failure.

Based on receiving one or more flags, or otherwise when there is any indication of physical sensor failure, the control system initiates a sensorless (indirect) position estimation algorithm. In one embodiment, the sensorless position estimation process starts immediately or otherwise as soon as possible once the triggering flag $F_{IN}$ is raised for any type of faults on the physical position sensors. The transition flag $F_{TR}$ may be used to ultimately alert a field oriented control module 86 to transition into a fault tolerant control mode.

For example, as shown in FIG. 5, position signals $\theta_1$ and $\theta_2$ from a primary position sensor and a secondary position sensor (collectively the position sensors 86) are input to the error monitoring module 80 and to a signal storage module 102. The signal storage module 102 also receives a motor velocity signal $\theta_{err}$. An error triggering sub-module 104 determines whether an error signal $\theta_{err}$ from correlation of the position measurements exceeds a first threshold (e.g., an initialization threshold) for a selected period of time, indicating a potential error condition. For example, if the error signal $\theta_{err}$ is above a selected value, a PN counter begins counting up in discrete steps, and if the number of steps exceeds a detector threshold, a triggering flag $F_{IN}$ is generated.

If a potential error condition is detected, a triggering flag $F_{IN}$ is output to the position calculation module 82. In the example of FIG. 5, the flag $F_{IN}$ is output to an initial prediction sub-module 106 that calculates an initial position based on the position and velocity signals and outputs the initial position to a position observer 108. The flag $F_{IN}$ triggers the FTO system to initiate an observer-based estimation process by providing proper initial position information through an initial position prediction algorithm.

If the error signal $\theta_{err}$ exceeds a second threshold (e.g., a transition threshold), a transition flag $F_{TR}$ is generated. For example, the error detection sub-module 88 outputs the transition flag to the signal selection module 84. The signal selection module 84 receives the transition flag, along with measured position information and an estimated motor position $\hat{\theta}$ generated by the position observer 108.

The status of the error indication flag $F_{IN}$ determines the starting of the sensorless control initialization process. As soon as the $F_{IN}$ status changes to TRUE state, which implies that there is a potential of sensor failure, an algorithm goes through certain initialization steps to initiate the sensorless position estimation algorithm.

The position calculation module 82 is configured to execute an algorithm to accomplish one or more tasks upon receiving the triggering flag or other indication of a potential error or proximity to failure condition. A first task is to predict the correct motor position at the present time (i.e., when $F_{IN}$ just gets set), which is referred to herein as an "initial position." A second task is to detect exactly which sensor (e.g., primary or secondary) is faulty or potentially faulty.

In one embodiment, the position calculation module 82 predicts the initial position, e.g., using the initial prediction sub-module 106. Upon receiving the triggering flag, the initial position is performed by determining a time duration before the actual beginning of the fault of the motor position sensor.

In one embodiment, the initial position is calculated by determining a time duration ($t_{fault}$) between the last sample time or other time at which no error condition was detected, and the present time at which the fault occurred or at which a potential fault was detected. Since the fault thresholds are usually small and velocity is an inherently slow varying signal, it can be assumed that the velocity does not change much between the time the fault occurred and when $F_{IN}$ is set.

First, an initial sample number $k_0$ is picked, which is sufficiently high in order to obtain a velocity sample from the pre-fault period. The initial sample number represents a position signal sample that was taken from the position sensors prior to detecting the fault and/or error condition. Then, an initial velocity $\omega_0$ is obtained from a velocity buffer or other storage location as follows.

$$\omega_0 = \omega[n-k_0],$$

where n is a sample number at the time that the fault or error condition was detected, and ω is the motor velocity at the sample number n.

Note that $k_0$ may could be a fixed value, or may be calculated from the initialization threshold and an averaged (either simple or weighted) value of a fixed number of previous velocity samples ($\omega_{AVG}$). Further, to avoid inclusion of velocity transients caused by position errors, the value of $\omega_{AVG}$ could be filtered as well.

Once the initial velocity is obtained, $t_{fault}$ may be calculated as follows:

$$t_{fault} = \frac{\delta_{IN}}{\omega_0},$$

where $\delta_{IN}$ is the initialization threshold. Thereafter, the approximate sample number k at which the system was in pre-fault condition is obtained as follows.

$$k = \frac{t_{fault}}{T_s}$$

The pre-fault speed $\omega_a$ is then calculated using the equation shown below.

$$\omega_a = \omega[n-k]$$

Finally, the correct initial position is calculated as follows.

$$\theta_0 = \theta_1[n-k] + \omega_a t_{fault}$$

Proper initialization of sensorless control requires knowledge of position and velocity signals during the pre-fault condition. For this purpose, a buffer such as a rolling or circular buffer may be utilized. The total time taken for triggering is dependent on the instantaneous velocity, the initialization threshold ($\delta_{IN}$), and the type of position sensor error. For instance, if the velocity of the machine is very slow when the sensor begins to fail, the total time taken for $F_{IN}$ to set might be very large since the buffer size in an embedded system must be large enough to store the signal values from pre-fault period, irrespective of the fault conditions. However, since the total memory available in a typical microprocessor employed for an embedded application is not unlimited, the size selection must be done judiciously.

Buffer size (b) may be selected using variables including a minimum system velocity $\omega_{min}$, sampling time $T_s$ and the threshold $\delta_{IN}$ as shown below:

$$b = \frac{\delta_{IN}}{\omega_{min} T_s}.$$

It can be seen from the above equation that as $\omega_{min}$ gets smaller, a larger b is needed for a given $\delta_{IN}$. Alternatively, $\delta_{IN}$ may be reduced to keep the buffer size reasonable, as long as it is kept large enough to avoid an erroneous setting of $F_{IN}$. If b is too small, then it is possible that no pre-fault data is retained in the buffer for initialization.

Since there is typically exists a maximum limit on the buffer size, it is possible to optimize the buffering of the velocity signal by storing them at a slower rate. This concept is referred to as decimation. Decimation is possible because velocity is fundamentally a low bandwidth signal as compared to position in an EPS system. It is also possible to decimate position signals if some amount of error in the initial condition may be tolerated.

Although once $t_{fault}$ has been determined, the initial position prediction does not depend on the knowledge of which position sensor has failed. However, it may sometimes be useful to identify the faulty sensor in order to initialize the system, as an additional layer of coverage.

In one embodiment, the following calculations are performed in order to identify the faulty sensor. In this embodiment, the position sensors include a first sensor that outputs a position signal $\theta_1$, and a second sensor that outputs a position signal $\theta_2$.

$$\theta_{1t} = \theta_1[n] + \omega_a t_{fault}$$

$$\theta_{2t} = \theta_2[n] + \omega_a t_{fault}$$

$$\theta_{1et} = |\theta_{1t} - \theta_2[n]|$$

$$\theta_{2et} = |\theta_{2t} - \theta_1[n]|$$

where $\theta_{1t}$ and $\theta_{2t}$ are position values at a time associated with the initial position.

The values $\theta_{1et}$ and $\theta_{2et}$ are the "post-correction error values" of the two position signals. The faulty signal is determined by checking which value (e.g., $\theta_{1et}$ and $\theta_{2et}$) is closer to zero. This is based on the idea that the error value that goes to zero after correction is the one that needed the correction in the first place, and is thus the faulty one.

After detecting the faulty position sensor, a pre-fault position value may be obtained from the buffer of the healthy sensor.

One the faulty sensor is detected, the position signal from the other sensor ($\theta_x$) may be used to compute the initial position as shown below.

$$\theta_0 = \theta_x[n-k] + \omega_a t_{fault}$$

With the capability of detecting the faulty sensor, it is possible to only initialize the estimators but not enter FTC mode, and use the healthy sensor(s) to continue normal FOC operation, while utilizing the estimated position to diagnose the healthy sensor. Thus, in one embodiment, the system is configured to transition to FTC mode when all physical position sensors have failed.

If all the physical position sensors become faulty in an EPS system, the system typically goes to shut-down mode and the driver does not receive any torque assist from the motor. But using embodiments described herein, this situation can be avoided by using the estimated position signal to control the motor. Using the estimated position, the system may be kept running to provide assist for a certain amount of time so that, e.g., a vehicle can be driven to a safe spot (which is sometimes called a "limp-aside" operation mode).

Figure 8:
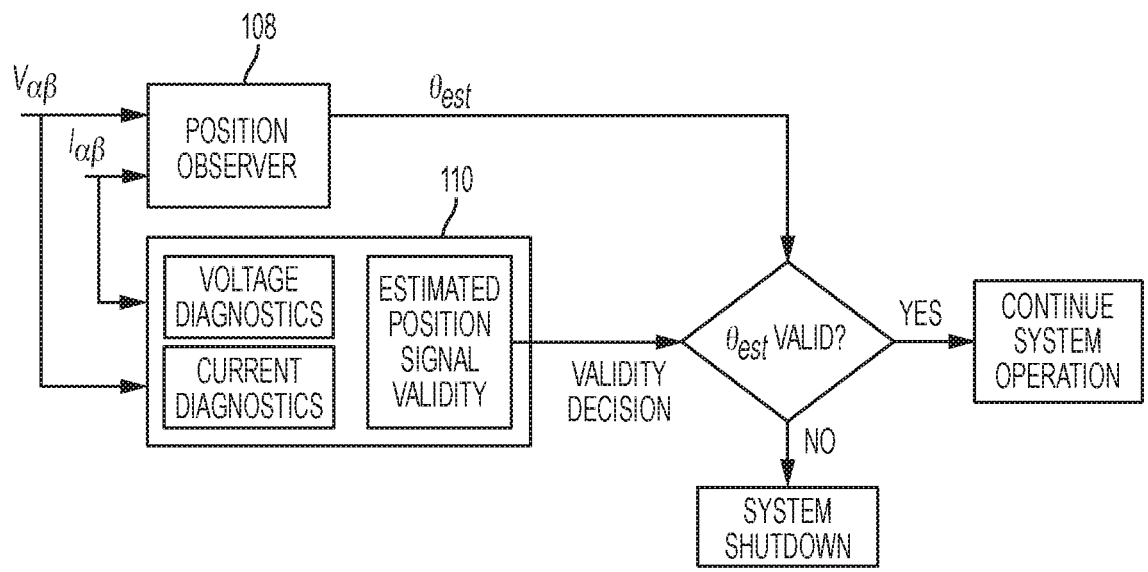
FIG. 8 is a functional block diagram showing aspects a system and method for continued operation of an electric motor control system after failure of physical position sensors.

FIG. 8 is a block diagram that illustrates aspects of a method for continued operation of an electric motor control system (e.g., an EPS system) when all of the physical position sensors fail. As shown in the diagram, current and voltage measurement signals $V_{\alpha\beta}$ and $I_{\alpha\beta}$ are input to a diagnostic module 110 which performs current and voltage diagnostics. The $V_{\alpha\beta}$ and $I_{\alpha\beta}$ are also input to the position observer 108 to generate an estimated position ($\theta_{est}$). If one or more of these signals are invalid (i.e., one or more of the current and voltage signals have failed), the system is shutdown. If the signals are valid, the limp-aside or continued operation of the system is enabled.

Figure 9:
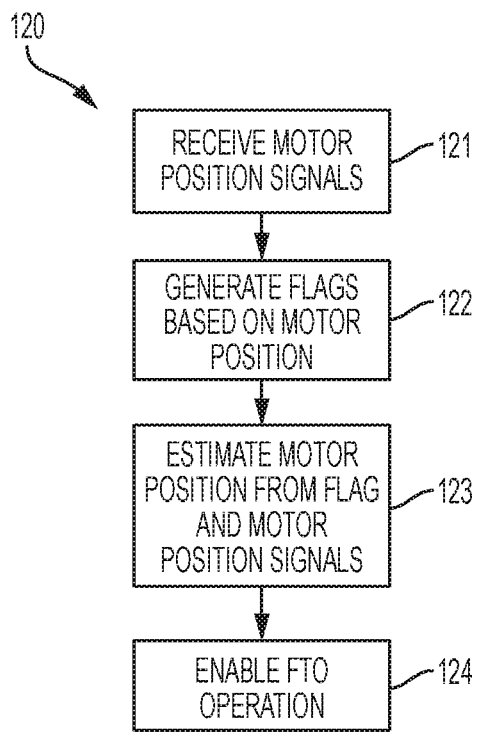
FIG. 9 depicts a method in accordance with one embodiment of the disclosure.

FIG. 9 illustrates a method 120 of transitioning to a fault tolerant mode of operation that can be performed by the control module 40 of FIG. 1. As can be appreciated in light of the disclosure, the order of operation within the method is not limited to the sequential execution as illustrated in FIG. 9, but may be performed in one or more varying orders as applicable in accordance with the present disclosure.

In one embodiment, the method at 121 receives a set of motor position signals from a motor vehicle sensor (one of the sensors 31-33) that generates the signals. In one embodiment, the motor vehicle sensor samples the motor position signals at a given frequency. At 122, the method generates an initialization flag signal and a transition flag signal based on the set of motor position signals. The set of motor position signals may be from a primary motor position sensor and a secondary motor position sensor, for example. At 123, the method estimates a position of the motor based on the initiation flag signal and the set of motor position signals. At 124, the method includes enabling a fault tolerant operation algorithm for the motor based on the estimated position, the transition flag signal, and an actual position provided by the at least one motor position sensor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system for monitoring operation of an electric motor, the control system comprising:
a plurality of position sensors each configured to output a measured position of the electric motor;
the control system operable to
operate the electric motor based on the measured position of the electric motor,
determine an estimated position of the electric motor using a model-based observer; and
responsive to a difference, between a first measured position output from a first one of the plurality of position sensors and a second measured position output from a second one of the plurality of position sensors, exceeding a predetermined threshold, operate the electric motor based on the estimated position of the electric motor; and
the control system configured to perform at least one of:
generating a triggering flag based on the difference exceeding a first threshold, the triggering flag causing initialization of an indirect estimation of the motor position, comprising prediction of an initial position at a time prior to the difference exceeding the first threshold; and
generating a transition flag based on the difference exceeding a second threshold that is greater than the first threshold, the transition flag causing the control system to transition from a first control mode to a second control mode, the first control mode causing the control system to control the motor based on one of the first measured position and the second measured position, the second control mode causing the control system to control the motor based on the indirect estimation of the motor position.

2. The control system of claim 1, wherein the control system is operable to generate a comparison health status flag that indicates whether at least one of the plurality of position sensors has failed or will potentially fail.

3. The control system of claim 1, wherein the control system is further configured to operate the electric motor based on the estimated position of the electric motor when an estimated difference between one of the first measured position and the second measured position and the estimated position exceeding a selected threshold.

4. The control system of claim 1, wherein the estimated position of the electric motor is based on a stator flux linkage, the stator flux linkage calculated based on voltage and current signals from the electric motor.

5. The control system of claim 1, wherein the control system is configured to estimate a time duration between the difference exceeding the first threshold and the initialization.

6. The control system of claim 5, wherein the control system is configured to identify which of the first one of the plurality of position sensors and the second one of the plurality of position sensors is faulty based on the time duration.

7. A method of monitoring operation of an electric motor, comprising:
receiving a first measured position of the electric motor from a first position sensor and receiving a second measured position of the electric motor from a second position sensor;
generating a position estimate of the motor based on a stator flux linkage, and using a model-based observer;
comparing the first measured position to the second measured position;
detecting a failure of at least one of the first position sensor and the second position sensor based on the comparison of the first measured position and the second measured position;
responsive to the failure, operating the electric motor based on the position estimate;
wherein the position estimate is based on an initial position prediction based on at least one of the first measured position and the second measured position.

8. The method of claim 7, further comprising generating a comparison health status flag that indicates whether at least one of the first position sensor and the second position sensor has failed or will potentially fail.

9. The method of claim 7, further comprising detecting the failure is based on a difference between at least one of the first measured position and the second measured position and the position estimate exceeding a selected threshold.

10. The method of claim 7, wherein the initial position prediction is based on the first measured position when a comparison between the second measured position and the position estimate exceeds a selected threshold.

11. A method of monitoring operation of an electric motor, the method comprising:
measuring a position of the electric motor by each of a plurality of position sensors during a field oriented control (FOC) operation mode;
calculating, by an error monitoring module, a difference between a first measured position output from a first one of the plurality of position sensors and a second measured position output from a second one of the plurality of position sensors, the calculating the difference comprising:
comparing the first measured position from the first one of the plurality of position sensors to the second measured position from the second one of the plurality of position sensors; and
based on the difference exceeding a predetermined threshold, causing an indirect position estimation module to initiate an indirect estimation of the position of the motor using a model-based observer;
operating the electric motor with a control system; and
at least one of:
generating a triggering flag based on the difference exceeding a first threshold, the triggering flag causing initialization of the indirect estimation of the position of the motor, comprising prediction of an initial position at a time prior to the difference exceeding the first threshold; and
generating a transition flag based on the difference exceeding a second threshold that is greater than the first threshold, the transition flag causing the control system to transition from a first control mode to a second control mode, the first control mode causing the control system to control the motor based on one of the first measured position and the second measured position, the second control mode causing the control system to control the motor based on the indirect estimation of the position of the motor.

12. The method of claim 11, further comprising generating an error condition flag based on the difference between the first measured position and the second measured position.

13. The method of claim 11, further comprising estimating a time duration between the difference exceeding the first threshold and the initialization.

14. The method of claim 13, further comprising identifying which of the first one of the plurality of position sensors and the second one of the plurality of position sensors is faulty based on the time duration.

* * * * *